US012623584B2

(12) United States Patent
Minjeur et al.

(10) Patent No.: US 12,623,584 B2
(45) Date of Patent: May 12, 2026

(54) DEPLOYABLE PANEL HAVING RIGIDIZING ELEMENTS WITH INFLATABLE SUPPORTS

(71) Applicant: GM Global Technology Operations LLC, Detroit, MI (US)

(72) Inventors: Patrick Minjeur, Sterling Heights, MI (US); Paul W. Alexander, Ypsilanti, MI (US); Lisa M. Simms, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 735 days.

(21) Appl. No.: 17/970,807

(22) Filed: Oct. 21, 2022

(65) Prior Publication Data

US 2024/0131976 A1 Apr. 25, 2024
US 2024/0227653 A9 Jul. 11, 2024

(51) Int. Cl.
*B60P 1/43* (2006.01)

(52) U.S. Cl.
CPC ..................................... *B60P 1/43* (2013.01)

(58) Field of Classification Search
CPC ................................... B60P 1/43; B60P 1/435
See application file for complete search history.

(56) References Cited

U.S. PATENT DOCUMENTS 3,642,156 A * 2/1972 Stenson ................... B60P 1/435
296/61
4,668,002 A 5/1987 Hanson 5,412,822 A 5/1995 Kelly
5,651,706 A 7/1997 Kasper
6,328,366 B1 * 12/2001 Foster ..................... B60R 11/00
296/37.2
9,199,569 B2 * 12/2015 Justak ..................... B65G 69/30
10,040,385 B2 * 8/2018 Stevens ..................... B60P 1/43
2007/0289073 A1 12/2007 Williams
2012/0100765 A1 4/2012 Simon et al.
2012/0297558 A1 11/2012 Wang et al.
2016/0281308 A1 * 9/2016 Sullivan ................... E01F 13/12
2019/0106916 A1 * 4/2019 Sutherland .............. E05B 51/02
2021/0331811 A1 * 10/2021 Lenaburg ............... B64D 47/02
2024/0017657 A1 1/2024 Castillo

FOREIGN PATENT DOCUMENTS

CA 2441358 A1 3/2004
CN 102644240 A 8/2012
DE 102019118783 A1 1/2021

* cited by examiner

*Primary Examiner* — Tara Schimpf
(74) *Attorney, Agent, or Firm* — CANTOR COLBURN LLP

(57) ABSTRACT

A deployable structure includes a reconfigurable member formed from a plurality of elements defining a first end, a second end that is opposite the first end, a first side extending between the first end and the second end, and a second side, opposite the first side, extending between the first end and the second end. A first inflatable rigidizing member extends along the first side across each of the plurality of elements and a second inflatable rigidizing member extends along the second side across each of the plurality of elements.

20 Claims, 3 Drawing Sheets

DEPLOYABLE PANEL HAVING RIGIDIZING ELEMENTS WITH INFLATABLE SUPPORTS

INTRODUCTION

The subject disclosure relates to the art of deployable structures and, more particularly, to a deployable panel having rigidizing elements with inflatable supports.

Portable, deployable panels are convenient in a wide variety of fields. For example, portable, deployable panels may provide shade, may be used as tables, ramps, room dividers, or combined to provide shelter. Often times, the portable, deployable panels or structures will include rigidizing elements that provide structural support for the panel and/or structure formed from multiple panels. Rigidizing elements may take the form of aluminum tubes, carbon-fiber rods and the like.

Typically, rigidizing elements provide support along a single axis. To provide support for multiple axes, rigidizing elements may be joined to form various nodes. Creating a structure of interconnected rigidizing elements can be difficult, and time consuming. Further, the multiple rigidizing elements and connectors are bulky and easily lost making construction difficult if not impossible. Accordingly, it is desirable to provide a deployable panel with rigidizing elements that may provide structural support without the need for complicated connection schemes and multiple components.

SUMMARY

A deployable structure, in accordance with a non-limiting example, includes a reconfigurable member formed from a plurality of elements defining a first end, a second end that is opposite the first end, a first side extending between the first end and the second end, and a second side, opposite the first side, extending between the first end and the second end. A first inflatable rigidizing member extends along the first side across each of the plurality of elements and a second inflatable rigidizing member extends along the second side across each of the plurality of elements.

In addition to one or more of the features described herein a third inflatable rigidizing member extends across each of the plurality of elements.

In addition to one or more of the features described herein the third inflatable rigidizing member is arranged between the first inflatable rigidizing member and the second inflatable rigidizing member.

In addition to one or more of the features described herein a flexible cover includes a first surface, a second surface, and an interior zone arranged between the first surface and the second surface, each of the plurality of elements being disposed in the interior zone.

In addition to one or more of the features described herein each of the first inflatable rigidizing member, the second inflatable rigidizing member, and the third inflatable rigidizing member is arranged on the second surface.

In addition to one or more of the features described herein the reconfigurable member is selectively arranged in a deployed configuration wherein the first inflatable rigidizing member and the second inflatable rigidizing member are substantially parallel to one another, and a stowed configuration, wherein the reconfigurable member is rolled along an axis defined by the first side and the second side.

In addition to one or more of the features described herein the first end of the reconfigurable member includes a fluid inlet connected to each of the first inflatable rigidizing member and the second inflatable rigidizing member.

In addition to one or more of the features described herein each of the first inflatable rigidizing member and the second inflatable rigidizing member includes a protective cover.

In addition to one or more of the features described herein each of the plurality of elements comprises a slat having a length, a width, and a thickness that is substantially identical.

In addition to one or more of the features described herein the slat is formed from a resin composite.

A vehicle, in accordance with a non-limiting example, includes a body including at least one of a passenger compartment and a cargo bed, and a deployable structure forming a transition from a surface into one of the passenger compartment and the cargo bed. The deployable structure including a reconfigurable member formed from a plurality of elements defining a first end, a second end that is opposite the first end, a first side extending between the first end and the second end, and a second side, opposite the first side, extending between the first end and the second end. A first inflatable rigidizing member extends along the first side across each of the plurality of elements and a second inflatable rigidizing member extends along the second side across each of the plurality of elements.

In addition to one or more of the features described herein a third inflatable rigidizing member extends across each of the plurality of elements.

In addition to one or more of the features described herein the third inflatable rigidizing member is arranged between the first inflatable rigidizing member and the second inflatable rigidizing member.

In addition to one or more of the features described herein a flexible cover including a first surface, a second surface, and an interior zone arranged between the first surface and the second surface, each of the plurality of elements being disposed in the interior zone.

In addition to one or more of the features described herein each of the first inflatable rigidizing member, the second inflatable rigidizing member, and the third inflatable rigidizing member is arranged on the second surface.

In addition to one or more of the features described herein the reconfigurable member is selectively arranged in a deployed configuration wherein the first inflatable rigidizing member and the second inflatable rigidizing member are substantially parallel to one another, and a stowed configuration, wherein the reconfigurable member is rolled along an axis defined by the first side and the second side.

In addition to one or more of the features described herein a source of fluid, wherein the first end of the reconfigurable member includes a fluid inlet connected to each of the first inflatable rigidizing member and the second inflatable rigidizing member and the source of fluid.

In addition to one or more of the features described herein the vehicle defines a pickup truck having a tail gate, the deployable structure being integrated into the tail gate.

In addition to one or more of the features described herein the deployable structure defines a ramp that connects with the cargo bed.

In addition to one or more of the features described herein the deployable structure defines a ramp leading into the passenger compartment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
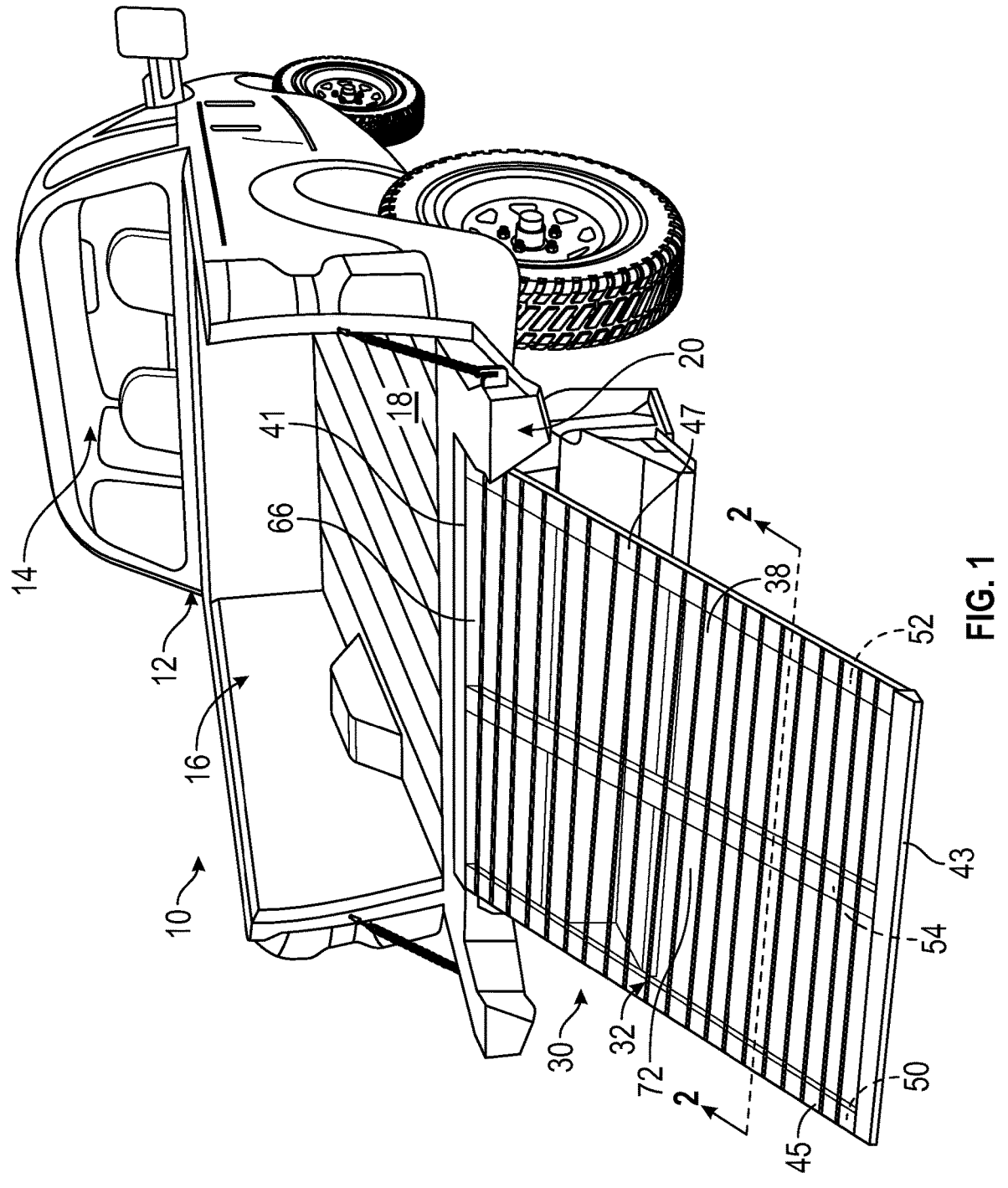
FIG. 1 is a perspective view of a deployable panel having rigidizing elements with inflatable supports used as a ramp, in accordance with a non-limiting example.

The following description is merely exemplary in nature and is not intended to limit the present disclosure, its application or uses. It should be understood that throughout the drawings, corresponding reference numerals indicate like or corresponding parts and features.

Figures 2, 3:
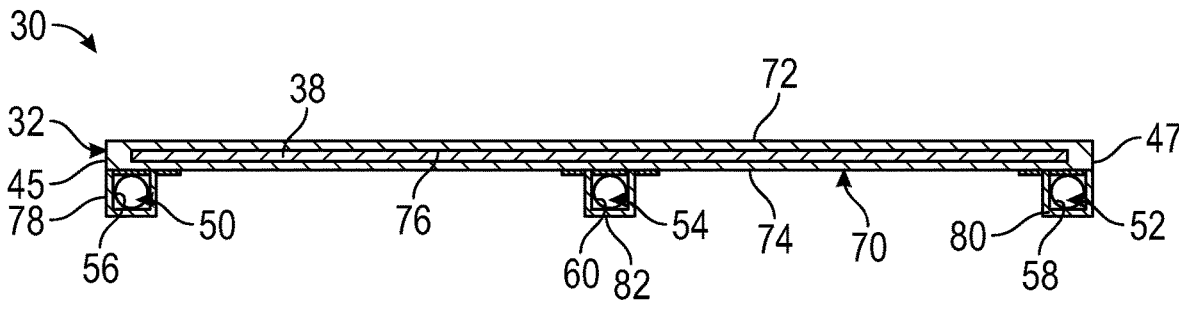
FIG. 2 is a cross-sectional view of the panel having rigidizing elements with inflatable supports of FIG. 1 taken along the lines 2-2, in accordance with a non-limiting example.
FIG. 3 depicts the ramp of FIG. 1 in a stowed configuration, in accordance with a non-limiting example.

A vehicle, in accordance with a non-limiting example, is indicated generally at 10 in FIG. 1. Vehicle 10 includes a body 12 that defines a passenger compartment 14. Vehicle 10 also includes a cargo bed 16 having a cargo bed surface 18. A tail gate 20 is pivotably mounted to cargo bed 16. In a non-limiting example, a deployable member 30 shown in the form of a ramp 32 is mounted to tail gate 20. Ramp 32 may be in a deployed configuration (FIG. 1) or a stowed configuration (FIG. 3). Ramp 32 may, in the configuration shown, provide a transition from the ground to cargo bed surface 18.

In a non-limiting example, ramp 32 includes a plurality of support elements 38 that define a first end 41, a second end 43, a first side 45 and a second side 47 of ramp 32. First end 41 may be connected to tail gate 20 while second end 43, when deployed, may rest on the ground. Second side 47 is opposite first side 45. Support elements 38 are sized, (e.g., possess a length, a width, and a thickness), such that they not only provide structural support but also are easily stowable such as through rolling. The particular material used to form support elements 38 may vary and can be tailored to specific applications. Similarly, the length, width, and thickness may be application specific. For example, if deployable member 30 is used as ramp 32, support elements 38 may be designed to support an ATV, a motorcycle, a lawn mower or the like. If, on the other hand, deployable structure is used as a non-load bearing structure, support members may be less robust.

In a non-limiting example, a first inflatable rigidizing member 50 extends along first side 45 across each of the support elements 38. A second inflatable rigidizing member 52 extends along second side 47 across each of the support elements 38. A third inflatable rigidizing member 54 extends across each of the support elements 38 between first inflatable rigidizing member 50 and second inflatable rigidizing member 52. Each of the first, second, and third inflatable rigidizing members 50, 52, and 54 are formed from flexible inflatable bladders 56, 58, and 60 respectively, FIG. 2.

In a non-limiting example, a header 66 may be arranged at first end 41. Header 66 is fluidically connected to each of the first, second, and third inflatable rigidizing members 50, 52, and 54 and a source of fluid 68 (FIG. 3). The source of fluid 68 may be a compressor (not shown) mounted in cargo bed 16. The source of fluid 68 may be activated to inflate each of the first, second, and third flexible inflatable bladders 56, 58, and 60 to deploy, (e.g., unroll), ramp 32 and to provide structural support to support elements 38.

In a non-limiting example, a protective, flexible cover 70 is disposed about support elements 38. Flexible cover 70 forms a first surface 72, a second surface 74 and an interior zone 76 within which is disposed support elements 38. In a non-limiting example, each of the first, second, and third inflatable rigidizing members 50, 52, and 54 are coupled to second surface 74. Further, each of the first, second, and third flexible inflatable bladders 56, 58, and 60 may be provided with corresponding flexible protective cover elements 78, 80, and 82.

Figure 4:
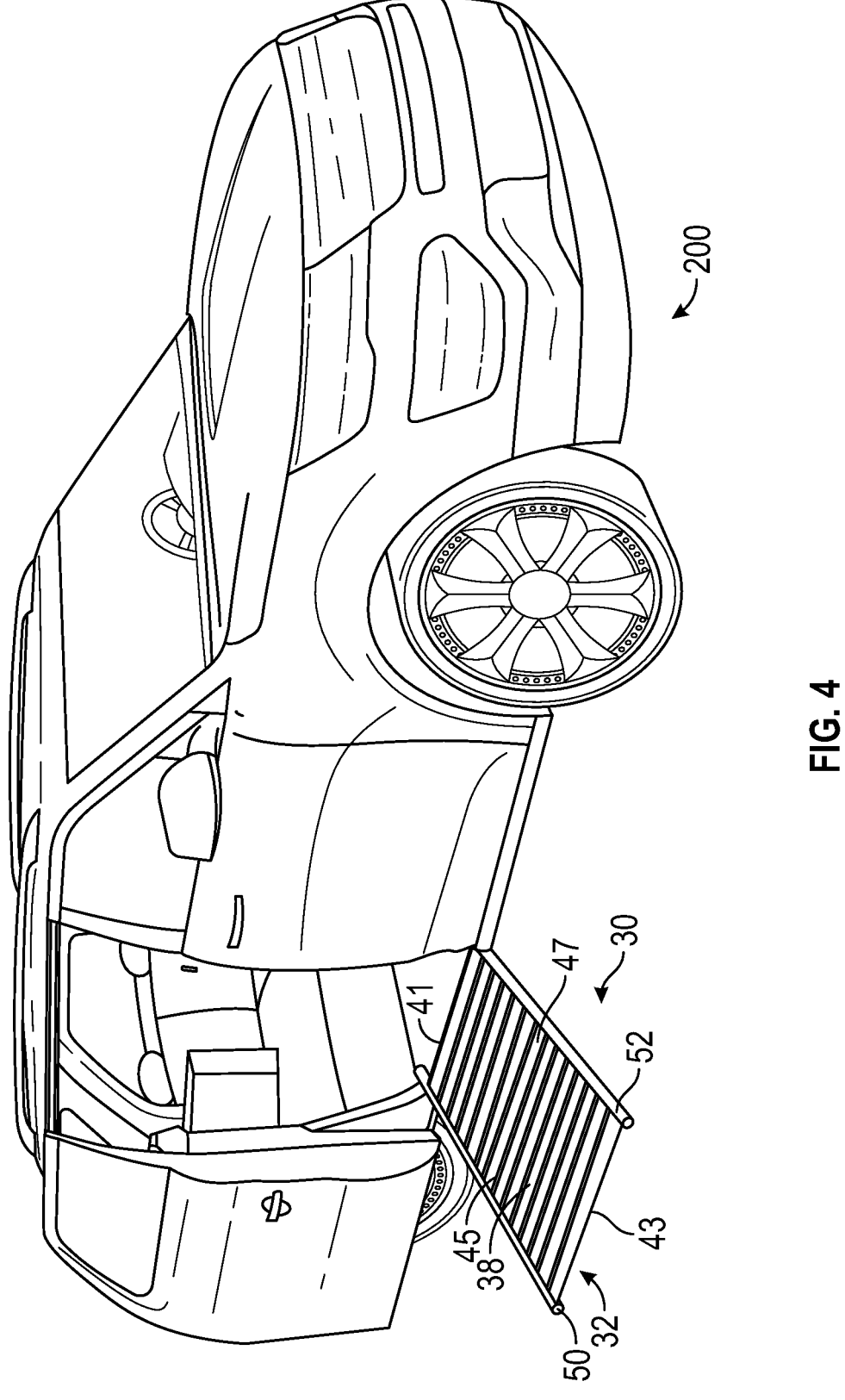
FIG. 4 is a perspective view of the ramp used to access a van, in accordance with a non-limiting example.

At this point, it should be appreciated that the deployable member in accordance with the disclosure may be employed as a ramp to facilitate access to a cargo bed, may provide handicap access to a van 200 (FIG. 4), or may be used as walls for portable structures (not shown). The deployable structure may be readily transitioned from a compact stowed configuration to a deployed configuration simply by inflating the rigidizing members. Thus, the deployable structure may be employed in a wide array of environments and may be adapted for a wide array of applications.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A deployable structure comprising:
a reconfigurable member formed from a plurality of elements defining a first end, a second end that is opposite the first end, a first side extending between the first end and the second end, and a second side, opposite the first side, extending between the first end and the second end;
a first inflatable rigidizing member extending along the first side across each of the plurality of elements; and
a second inflatable rigidizing member extending along the second side across each of the plurality of elements,
wherein the deployable structure is configured to form a transition from a surface into a vehicle passenger compartment or a vehicle cargo bed.

2. The deployable structure according to claim 1, further comprising a third inflatable rigidizing member extending across each of the plurality of elements.

3. The deployable structure according to claim 2, wherein the third inflatable rigidizing member is arranged between the first inflatable rigidizing member and the second inflatable rigidizing member.

4. The deployable structure according to claim 2, further comprising a flexible cover including a first surface, a second surface, and an interior zone arranged between the first surface and the second surface, each of the plurality of elements being disposed in the interior zone.

5. The deployable structure according to claim 4, wherein each of the first inflatable rigidizing member, the second inflatable rigidizing member, and the third inflatable rigidizing member is arranged on the second surface.

6. The deployable structure according to claim 1, wherein the reconfigurable member has a deployed configuration in which the first inflatable rigidizing member and the second inflatable rigidizing member are substantially parallel to one another, and a stowed configuration in which the reconfigurable member is rolled about a rotation axis parallel to the first end.

7. The deployable structure according to claim 1, wherein the first end of the reconfigurable member includes a fluid inlet connected to each of the first inflatable rigidizing member and the second inflatable rigidizing member.

8. The deployable structure according to claim 1, wherein each of the first inflatable rigidizing member and the second inflatable rigidizing member includes a protective cover.

9. The deployable structure according to claim 1, wherein each of the plurality of elements comprises a slat, and the slat of each of the plurality of elements has a substantially identical length, a substantially identical width, and a substantially identical thickness.

10. The deployable structure according to claim 9, wherein the slat is formed from a resin composite.

11. A vehicle comprising:
a body including at least one of a passenger compartment and a cargo bed; and
a deployable structure forming a transition from a surface into one of the passenger compartment and the cargo bed, the deployable structure comprising:
a reconfigurable member formed from a plurality of elements defining a first end, a second end that is opposite the first end, a first side extending between the first end and the second end, and a second side, opposite the first side, extending between the first end and the second end;
a first inflatable rigidizing member extending along the first side across each of the plurality of elements; and
a second inflatable rigidizing member extending along the second side across each of the plurality of elements.

12. The vehicle according to claim 11, further comprising a third inflatable rigidizing member extending across each of the plurality of elements.

13. The vehicle according to claim 12, wherein the third inflatable rigidizing member is arranged between the first inflatable rigidizing member and the second inflatable rigidizing member.

14. The vehicle according to claim 12, further comprising a flexible cover including a first surface, a second surface, and an interior zone arranged between the first surface and the second surface, each of the plurality of elements being disposed in the interior zone.

15. The vehicle according to claim 14, wherein each of the first inflatable rigidizing member, the second inflatable rigidizing member, and the third inflatable rigidizing member is arranged on the second surface.

16. The vehicle according to claim 11, wherein the reconfigurable member has a deployed configuration in which the first inflatable rigidizing member and the second inflatable rigidizing member are substantially parallel to one another, and a stowed configuration in which the reconfigurable member is rolled about a rotation axis parallel to the first end.

17. The vehicle according to claim 11, further comprising:
a source of fluid,
wherein the first end of the reconfigurable member includes a fluid inlet connected to each of the first inflatable rigidizing member and the second inflatable rigidizing member and the source of fluid.

18. The vehicle according to claim 11, wherein the vehicle defines a pickup truck having a tail gate, the deployable structure being integrated into the tail gate.

19. The vehicle according to claim 18, wherein the deployable structure defines a ramp that connects with the cargo bed.

20. The vehicle according to claim 11, wherein the deployable structure defines a ramp leading into the passenger compartment.

* * * * *